March 15, 1938. M. GLENN 2,110,952
THERMOSTATIC FAUCET
Filed Oct. 17, 1933 3 Sheets-Sheet 1
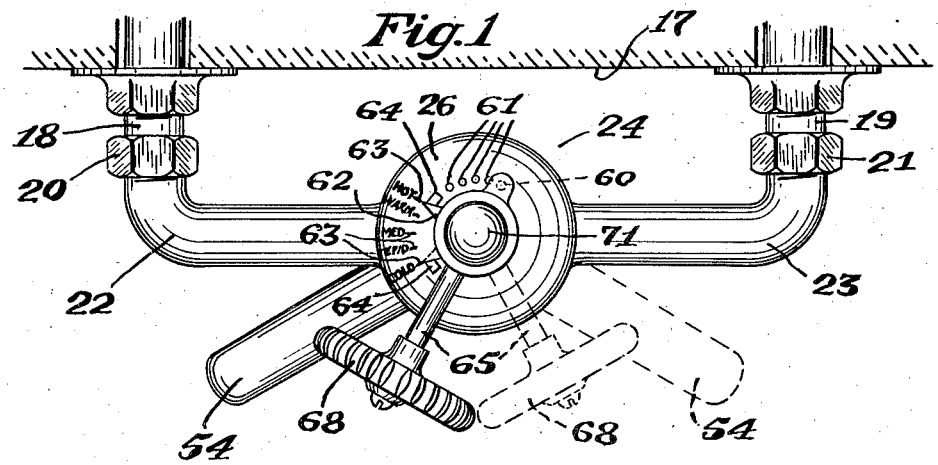
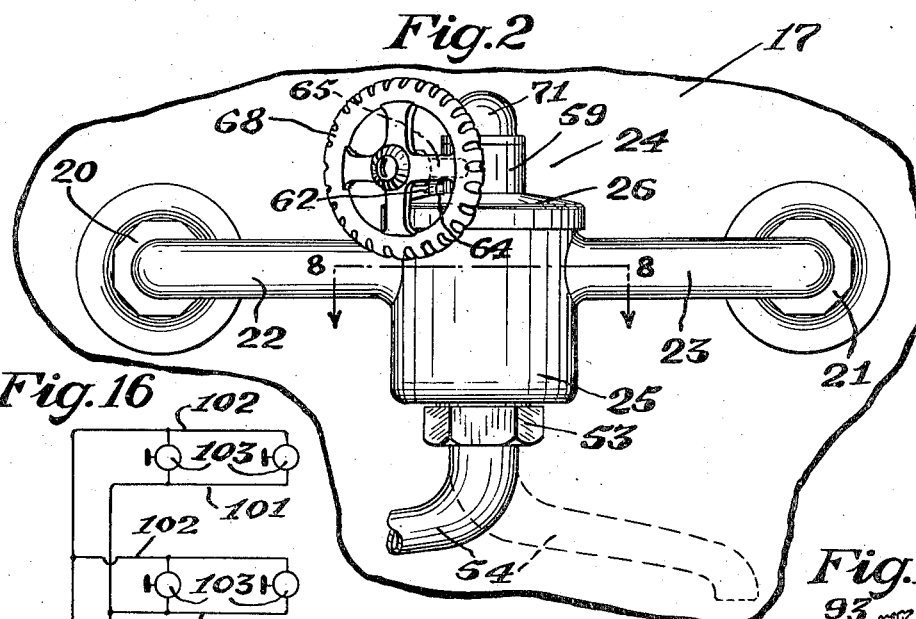
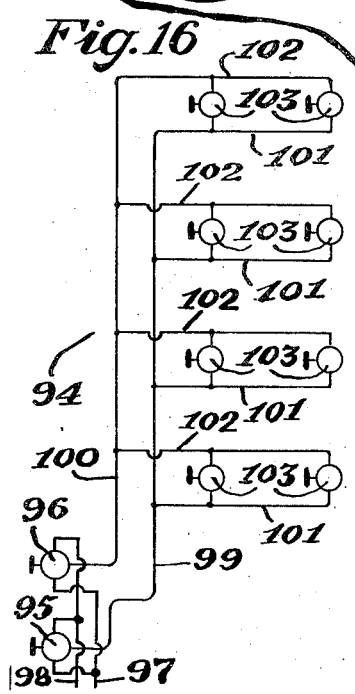
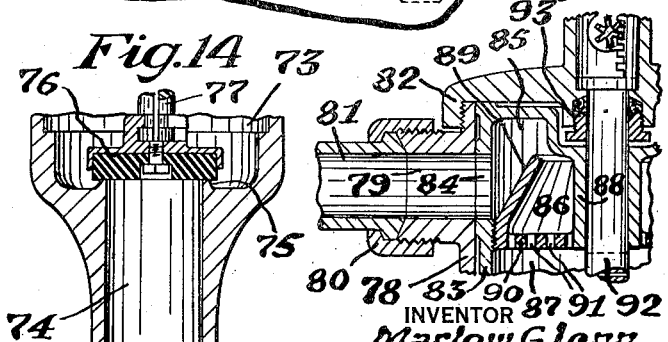
INVENTOR
Marlow Glenn.
BY James E. Sproll
ATTORNEY

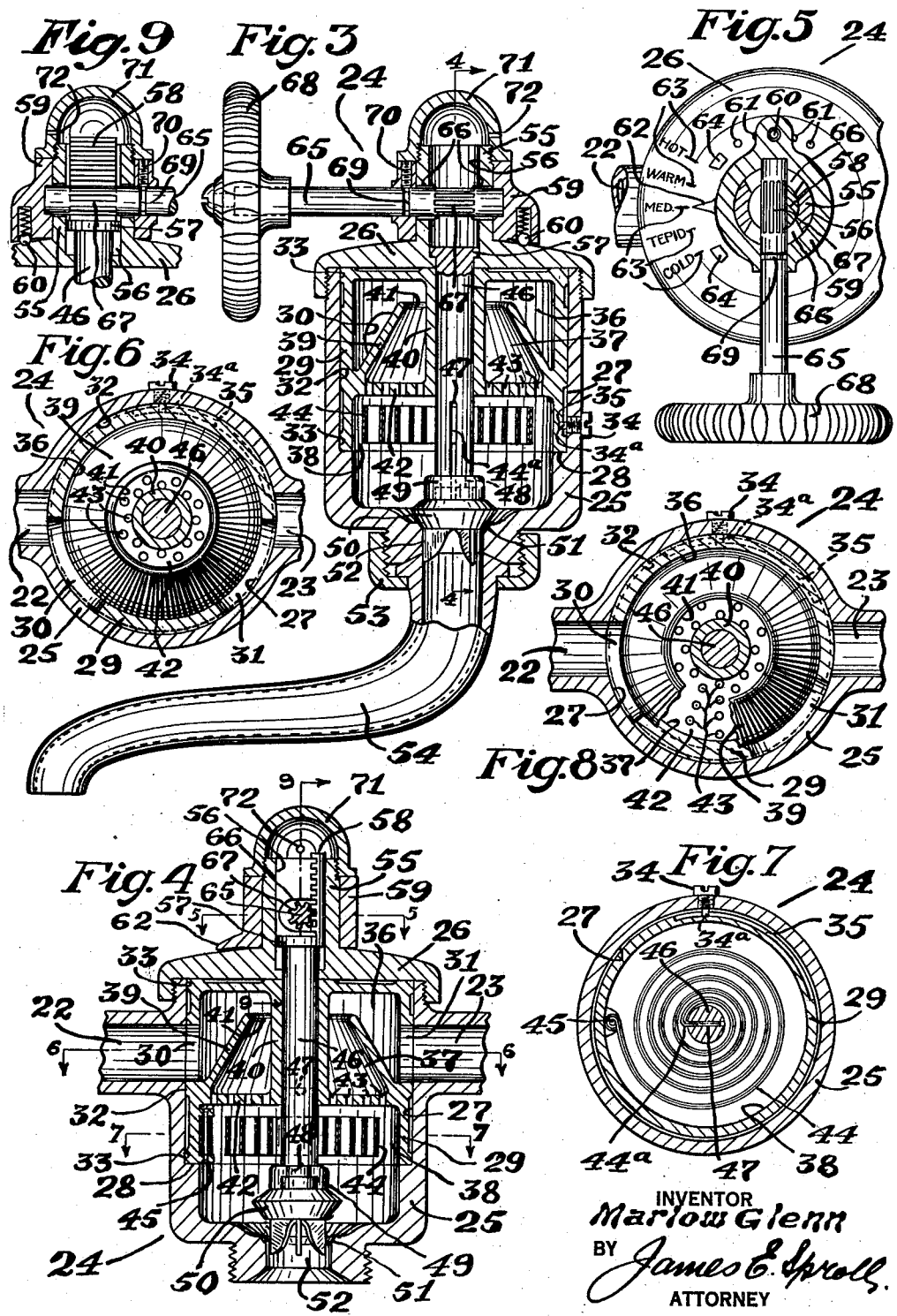

March 15, 1938. M. GLENN 2,110,952
THERMOSTATIC FAUCET
Filed Oct. 17, 1933 3 Sheets-Sheet 3
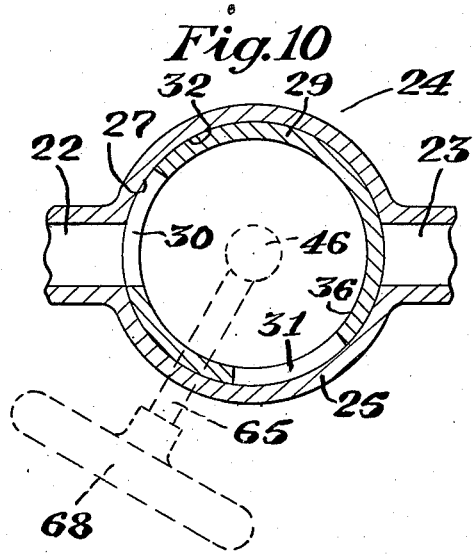
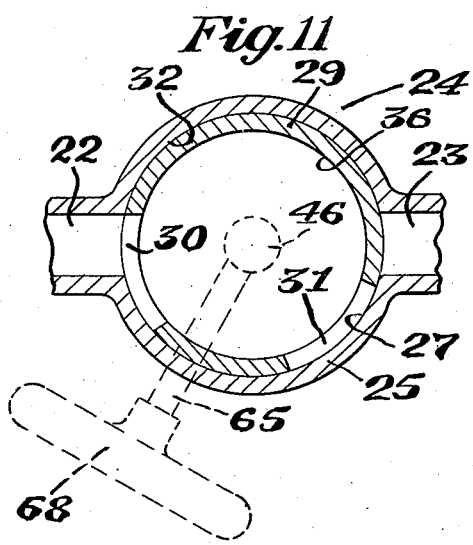
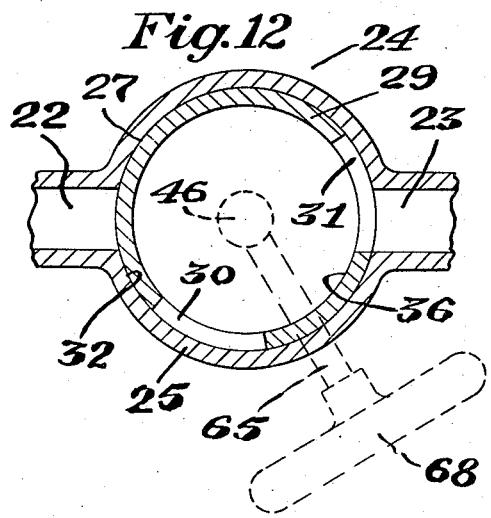
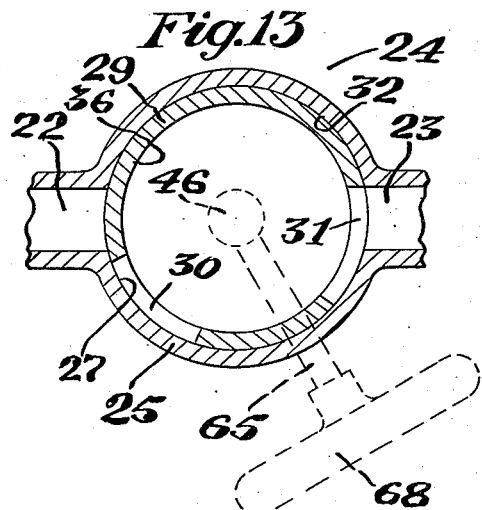
INVENTOR
*Marlow Glenn.*
BY
*James E. Sprott.*
ATTORNEY Patented Mar. 15, 1938

2,110,952

UNITED STATES PATENT OFFICE 2,110,952

THERMOSTATIC FAUCET

Marlow Glenn, Longmire, Wash., assignor of one-half to Walter Hewitt, Longmire, Wash.

Application October 17, 1933, Serial No. 693,925

12 Claims. (Cl. 236—12)

This invention relates to thermostatic faucets and aims primarily to provide a novel thermostatic faucet wherein fluids of different temperatures are thoroughly intermixed and wherefrom fluid is delivered at any selected stabilized temperature between the initial temperatures of the intermixed fluids.

Broadly contemplated by the present invention is the provision of a novel thermostatic faucet embodying within the same, valve means, fluid mixing means and temperature stabilizing means, and exteriorly thereof having a single control member for manipulating said valve means and temperature stabilizing means whereby regulation of the volume and temperature of the fluid delivered by said faucet are independently or simultaneously effected as desired.

With the foregoing in view the invention essentially resides and is more particularly concerned in the provision of a novel thermostatic faucet, which is especially designed and particularly adapted for use in kitchens, bathrooms, lavatories, bakeries, hospitals, laundries, or any other place where a flow of fluid at a constant temperature is required, which is similarly designed and adapted for use with and rapid and ready attachment to old or new plumbing installations without necessitating any changes or alterations of the latter, which is so fabricated that the several parts thereof are rapidly and readily removed for repairs or replacement without disconnecting the faucet from its fluid supply and without requiring any special skill or tools, and which in its preferred embodiment is characterized by the employment of a casing having fluid inlets and a fluid outlet, a sleeve valve having apertures in the walls thereof adapted to register with said fluid inlets and also having a plurality of fluid mixing chambers formed therein, a valve for said fluid outlet, a thermostat connected to said sleeve valve for effecting automatic actuation of the same to maintain the temperature of the fluid delivered by the faucet, and a manually operable single control member adapted to effect adjustment of the sleeve valve and setting of its thermostat independently of regulating the outlet valve and also adapted to effect simultaneous sleeve valve adjustment, thermostat setting and outlet valve regulation, all of which are important elements and features of the present invention and are to be correlated in the broad aim of enhancing the efficiency of the thermostatic faucet for general use.

The above, and additional objects which will hereinafter be more specifically treated are attained by such means as are shown in the accompanying drawings, described in the following specification and then more clearly pointed out in the claims, which are appended hereto and form part of this application.

With reference to the drawings, in which there are illustrated several embodiments of the invention and throughout the several views of which like characters of reference designate similar parts:

Figure 1 is a top plan view of a thermostatic faucet comprehended by the present invention, as it would appear when operatively connected to a plumbing installation.

Fig. 2 is a front elevation thereof.

Fig. 3 is a vertical transverse medial section of the faucet, with its sleeve valve and control member in a mid-position.

Fig. 4 is a fragmentary vertical longitudinal medial section taken through 4—4 of Fig. 3.

Figs. 5, 6 and 7 are horizontal sections taken through 5—5, 6—6 and 7—7, respectively, of Fig. 4.

Fig. 8 is a horizontal section taken through 8—8 of Fig. 2.

Fig. 9 is a fragmentary vertical transverse section taken through 9—9 of Fig. 4.

Fig. 10 is a diagrammatic view in horizontal section illustrating the position assumed by the sleeve valve within its casing, when said sleeve valve has been moved into registration with the hot water inlet and its correlated thermostatic coil is cold.

Fig. 11 is a similar view illustrating the position assumed by the sleeve valve when its correlated thermostatic coil has become heated and expanded.

Fig. 12 is a similar view illustrating the position of the sleeve valve within its casing, when said sleeve valve has been moved into registration with the cold water inlet and its correlated thermostatic coil is hot.

Fig. 13 is a similar view illustrating the position assumed by the sleeve valve when its correlated thermostatic coil has become cold and contracted.

Fig. 14 is a fragmentary vertical medial section of a slightly modified form of fluid outlet and outlet valve for the faucet.

Fig. 15 is a fragmentary vertical longitudinal medial section of a slightly modified form of thermostatic faucet, and Fig. 16 is a diagrammatic view of a hot and cold water supply system embodying my novel and improved faucets.

Before taking up a more detailed description of the drawings, a general exposition of the specific purposes, functions and advantages of the thermotatic faucet evolved by the present invention will be undertaken.

Certain objections have been noted heretofore to the faucets in general use, principally among which were: that no provision was made therein for the proper and effective intermixing of fluids of different temperatures, nor any means for stabilizing the temperature of the fluids delivered by said faucets, hence resulting in wide temperature variations of the fluids flowing therefrom and necessitating constant regulation of the faucets to obtain fluids of the desired temperatures. Furthermore, I am aware that thermostatic devices have formerly been employed for controlling temperatures of fluids delivered by their associated fluid supply systems, but such devices were not incorporated or embodied within the faucets or discharge fixtures of said systems, but were separate and distinct therefrom and required special plumbing connections, consequently when these devices were installed in old plumbing systems extensive alterations in the latter and in their adjacent enclosing wall structures were necessary and essential, thus involving considerable time and labor to effect such installations. Again, in thermostatically controlled fluid supply systems heretofore in use, dual controls for regulating the temperature and volume of the fluids therefrom were necessary, that is to say, one control for selecting the desired temperature and another or second control for regulating the volume of fluid delivered.

Wherefore, it is the primary purpose and fundamental object of this invention to obviate and eliminate all of the foregoing objections to and disadvantages of the faucets and thermostatically controlled fluid supply systems or devices heretofore in use, by providing a novel and improved thermostatic faucet embodying in a single structure, fluid mixing means, temperature stabilizing means, and a single control member for selecting the temperature and regulating the volume of the fluid delivered by the faucet, and further by providing a thermostatic faucet adapted to replace old faucets without any material expenditure of time and labor other than that necessary to detach the old faucet and attach the present thermostatic faucet.

Beginning now the more detailed description of the invention by reference to the accompanying drawings, and referring here more particularly to Figs. 1 to 13, inclusive, the numeral 17 designates the portion of a wall, wash basin, bathtub, kitchen sink, or the like, from which normally project the ends of hot and cold water supply pipes 18 and 19, respectively. Connected in any well known or conventional manner to these hot and cold water supply pipes 18 and 19, as for example, by unions 20 and 21, respectively, are the outer terminals of the hot and cold water inlet branches 22 and 23, respectively, of my novel and improved thermostatic faucet herein generally designated by the numeral 24.

The faucet 24 is provided with a cylindrical casing or body 25, to the upper portion of which are integrally connected, in diametrically opposed relation, the inner ends of the hot and cold water inlet branches 22 and 23, see Figs. 2, 4, 6 and 8. The casing 25, in the present instance, is preferably provided with an open upper end, whereby access may be readily had to the interior of the same to facilitate the insertion therein and removal therefrom of the several working parts of the faucet without disconnecting or disturbing its connections with the hot and cold water supply pipes 21 and 22, which open upper end is adapted to be normally closed by a cover 26 threadedly secured thereat upon the casing 25, see Figs. 3 and 4. The bore of the casing 25 is slightly and concentrically enlarged, as indicated at 27, which enlargement extends downwardly within said casing from its open upper end to a point adjacent the lower or outlet end thereof, see Figs. 3 and 4, said enlargement at its lower end forming an annular shoulder 28 upon the inner walls of the casing 25, for a purpose which will now be described.

Concentrically disposed within the enlargement 27 for partial or limited rotative movement therein is a sleeve valve 29, the lower open end of which normally abuts or seats upon the annular shoulder 28, while its upper closed end is normally abutted by the cover 26, to thereby maintain and retain said sleeve valve in operative position within the enlargement 27, as will be manifest and apparent by referring to Figs. 3 and 4. Formed or provided in circumferential spaced relation within the peripheral walls of the sleeve valve 29 are circumferentially elongated hot and cold water inlet ports or apertures 30 and 31, respectively, which ports are selectively adapted for either independent or joint registration with their correlated hot and cold water inlet branches 22 and 23, respectively, of the casing 25, substantially in the manner more clearly shown in Figs. 6, 8 and 10 to 13, inclusive. The sleeve valve 29, as above stated, is disposed for partial rotative movement within the enlarged portion 27 of the bore of the casing 25, however, in this connection it may be well to state, that said sleeve valve must of necessity and for obvious reasons fit in watertight relation within said enlargement 27, and for this purpose, the periphery of the sleeve valve in the plane of and surrounding its elongated ports 30 and 31, is provided with a peripheral or annular sealing face 32, which latter is normally in sealing contact with the walls of the enlargement 27, so that no leakage or escape of fluid occurs therebetween. The upper and lower ends of the sleeve valve 29 may also be provided, as shown, with relatively narrow peripheral or annular guiding faces 33, which latter also normally contact the walls of the enlargement 27 and function to minimize the wear of the sealing face 32. By thus providing the sealing face 32 and the guiding faces 33 on the periphery of the sleeve valve 29, in the manner herein shown and described, friction between said sleeve valve and the enlarged bore 27 is effectively minimized and materially reduced, thus insuring ease of operation of the sleeve valve 29, while retaining its sealing efficiency. As hereinbefore stated, the sleeve valve 29 is disposed within the enlarged bore 27 of the casing 25 for partial or limited rotative movement therein and in the present instance, such movement is limited or governed by a cap screw 34 extending through and threadedly engaged within the walls of such enlarged bore 27, said cap screw 34 having a terminal portion 34a of slightly reduced diameter adapted to normally seat within a circumferentially disposed groove 35 formed within the periphery of the sleeve valve 29 adjacent its lower end, see Figs. 3, 6, 7 and 8.

As now constructed, the sleeve valve 29 is provided interiorly thereof with an initial or upper fluid mixing chamber or compartment 36, a final or lower fluid mixing chamber or compartment 37, and a fluid temperature regulating chamber or compartment 38. The upper fluid mixing chamber 36, into which the hot and cold water elongated ports 30 and 31 lead and wherein the hot and cold water are initially mixed, is formed by the upper end wall of the sleeve valve, a frustro-conical wall or partition 39 which is integrally formed upon or otherwise fixedly secured to the inner walls of said sleeve valve to extend inwardly and upwardly therein from a point substantially midway the height thereof, and a central tubular portion 40 similarly formed upon or connected to the upper end wall of the sleeve valve to extend downwardly within the same through the frustro-conical wall 39, which latter at its upper end is spaced from said tubular portion to provide an annular passage or opening 41 between the upper and lower mixing chambers 36 and 37, see Figs. 3, 4, 6 and 8. The lower or final fluid mixing chamber 37 is formed by said frustro-conical wall 39, tubular portion 40 and a transversely disposed wall 42 extending across the interior of the sleeve valve 29, substantially at the juncture of the frustro-conical wall 39 therewith, said transverse wall 42 being integrally formed upon or otherwise fixedly secured to the inner walls of the sleeve valve, or integrally connected to said frustro-conical wall 39, as found desirable or deemed expedient, the present showing being merely by way of illustration. The central tubular portion 40 at its lower end may be integrally connected to the transverse wall 42, as shown, or said end may extend through said wall 42 if desired. Formed within the transverse wall 42 are a series of concentric rows of perforations 43 wherethrough the thoroughly intermixed fluids pass from the final mixing chamber 37 to the temperature regulating or stabilizing chamber 38, which latter is formed within the lower end of the sleeve valve 29 by the perforated transverse wall 42 at its upper end and at its lower or opposite end is completely open to the full interior diameter of the casing 25.

Mounted within the temperature regulating chamber 38 is a horizontally disposed thermostat 44 of coil form, adapted to operate by a rotary movement, the outer end of which is pivotally connected, as at 45, to the inner walls of the sleeve valve 29, while the inner terminal portion 44a of same is adapted to snugly and transversely seat within a valve shaft 46, the lower end portion of which is provided with a diametrically disposed open-ended slot 47, for such purpose. It is to be here noted and observed that this manner of mounting or supporting the thermostat coil 44 permits of its rapid and ready positioning in and removal from the sleeve valve and valve stem in the event repairs to or replacement of the same are found necessary.

The valve shaft 46, in the present instance, is mounted within the central tubular portion 40 of the sleeve valve 29 for independent limited rotative and axial sliding movement therein and extends from both the lower and upper ends of same, said valve shaft being peripherally grooved adjacent its lower end, as at 48, to receive an interiorly shouldered boss 49 of an outlet or discharge valve 50, said boss being open at one side thereof, see Fig. 4, whereby said valve may be rapidly and readily attached to and detached from the valve shaft 46, it being here noted, that the latter has free and independent rotative movement within the valve boss 49, due to the above described swivel connection therebetween, this in order to prevent rotation of the valve 50 during axial opening and closing movements of same.

The outlet or discharge valve 50 is of the well known bevelled edge type having the usual downwardly extending radially disposed guide wings, or vanes and when closed is adapted to fit within a correspondingly shaped seat 51 provided within the outlet or discharge passageway 52 of the casing 25, formed in the lower end wall thereof, to which is detachably connected by a union nut 53, or in any other well known or conventional manner, a swinging or swivelling spout 54.

The cover 26 of the casing 25 is provided upon its outer or upper face with an upwardly extending concentric hub 55, said cover and hub having an axially aligned counterbore 56 formed therein for the reception of the upper enlarged end 57 of the valve shaft 46 normally disposed for limited rotative and reciprocative movement therein, from which enlarged end extends upwardly in offset relation to the axis of same a rack 58.

Mounted for limited rotative movement upon the hub 55 of the cover 26 is a collar 59 having a spring-pressed ball 60 mounted within its lower face adapted to selectively seat within an arcuate row of recesses 61 formed at uniformly spaced intervals within the upper or outer face of said cover 26, see Figs. 3 and 5, said spring-pressed ball being adapted to yieldingly maintain said collar in any selected or adjusted position relative to the cover 26. The collar 59 is also provided with an index pointer or indicator 62 adapted to selectively register with a series of radially disposed graduations or markings 63 cut in or formed on the upper or outer face of the cover 26, said graduations being marked in the order named with the words "hot", "warm", "medium", "tepid" and "cold", it being here understood that specific temperatures may be substituted for such words, if desired. Formed upon the upper or outer face of the cover 26 adjacent the hot and cold graduations thereof are upwardly extending lugs or stops 64 adapted to be abutted by the pointer 62, to thereby limit the rotative movement of its correlated collar, when maximum and minimum temperatures have been reached, as will be manifest and apparent.

The numeral 65 designates a horizontally disposed valve actuating or control stem, the inner end portion of which is transversely mounted within the hub 55 and collar 59, in perpendicular relation to the axes thereof, for independent rotative movement relative to said hub and collar and for joint oscillative movement with said collar relative to the hub 55, and in order to effect such oscillative movement I provide the walls of the latter with diametrically opposed slots 66 wherethrough the journalled end portion of the stem 65 extends, all as more clearly illustrated in Figs. 3, 4 and 5. The portion of the stem normally disposed intermediately of the slots 66, is provided with a series of teeth 67 cut longitudinally within the periphery of such portion, said teeth being adapted to normally mesh with the teeth of the rack 58, to thereby impart axial movement to the valve shaft 46 upon rotation of the stem 65 and thus effect opening and closing movements of the valve 50, as will be obvious and apparent by referring more particularly to Fig. 4. Fixedly secured in any well known or conventional manner to the outer end of the control stem 65 is an operating handwheel 68. To positively prevent axial dislodgement of the inner end portion of the control stem 65 from within the hub 55 and collar 59, I provide said stem with a peripheral groove 69 within which normally seats the inner reduced end of a vertically disposed pin 70 threadedly engaged within the walls of the collar 59 in parallel relation to the axis of the same, substantially in the manner more clearly illustrated in Figs. 3 and 9.

To positively maintain the collar 59 in its operative position upon the hub 55 and to prevent axial movement of the same relative thereto I provide an interiorly threaded dome-shaped or hollow cover 71, which latter is threadedly secured to the exteriorly threaded upper end portion of the hub 55 normally projecting above the plane of the upper end of the collar 59, as shown in Figs. 3, 4 and 9. The cover 71 is provided with a vent hole or aperture 72, this in order to prevent formation of a vacuum within said cover and within the counterbore 56 during reciprocative movements of the enlarged upper end of the shaft 46 therein, as will be obvious and manifest.

In operating my present novel and improved thermostatic faucet 24, if water of a medium temperature is desired, the operator grasps the handwheel 68, and, if the same is not already in a central position, swings or moves the valve stem 65 to its mid-position indicated in Figs. 3, 4 and 5, at which time, said stem imparts rotative movement to the shaft 46 in an obvious manner, which latter in turn through the thermostat coil 44 imparts rotative movement to the sleeve valve 29, thus causing the elongated ports 30 and 31 thereof to register with the hot and cold water inlets 22 and 23, substantially in the manner shown in Fig. 6. Simultaneously with effecting the above described swinging movement of the valve stem 65 the operator also turns the handwheel 68 in a counter-clockwise direction, thus imparting rotative movement to the stem 65, which in turn imparts upward axial or sliding movement to the valve shaft 46, through the teeth 67 of said stem meshing with the rack 58 of said shaft and thereby effecting opening movement of the outlet valve 50. As the hot and cold waters flow from their respective supply pipes through their respective partially restricted ports 30 and 31 into the upper mixing chamber 36, such waters due to the then relative positions of said ports and the baffle action of the frusto-conical wall 39 are deflected forwardly thereby and a slight whirling motion imparted to said waters upon entering the mixing chamber 36, and inasmuch as the waters are deflected forwardly and given a slight whirling motion the same meet or come together substantially midway between the ports 30 and 31 and are thoroughly intermixed prior to overflowing from the mixing chamber 36 through the annular passageway 41 into the final mixing chamber 37, from whence the thoroughly intermixed waters pass downwardly and outwardly through the apertures or perforations 42, thence over the thermostat coil 44, past the open valve 50 to the outlet 52 and spout 54. Should the initial temperatures of the hot and cold water vary at any time while the faucet 24 is in operation, then, and in that event the thermostat coil 44 will expand if the intermixed water is increased in temperature and in so doing will effect a closing movement of the hot water port 30 and a corresponding opening movement of the cold water port 31. On the other hand, if the temperature of intermixed water is decreased or lowered, the thermostat coil 44 will contract and in so doing will effect an opening movement of the hot water port 30 and a corresponding closing movement of the cold water port 31. If hot water of maximum temperature is desired the operator swings or moves the valve stem 65 to the left, as shown in full lines in Fig. 1 and dotted lines in Figs. 10 and 11, at which time the port 30 is in full registration with its inlet 22 and the port 31 is cut-off or closed from its inlet 23, it being here important to note and observe, that should the thermostat coil 44 be cold or contracted when the valve stem 65 is swung or moved to the left, the sleeve valve 29 and its ports 30 and 31 will assume or be in the position, relative to the inlets 22 and 23, indicated in Fig. 10, however, as the hot water flows outwardly through the faucet 24, such water will cause said thermostat coil 44 to expand and in so doing the latter will impart rotative movement to the sleeve valve 29 in a counter-clockwise direction and thus cause its ports 30 and 31 to assume or be in the position, relative to the inlets 22 and 23, indicated in Fig. 11. If cold water of minimum temperature is desired the operator swings or moves the valve stem 65 to the right, as shown in dotted lines in Figs. 1, 12 and 13; at which time the port 30 is cut-off or closed from its inlet 22, while the port 31 is in full or complete registration with its inlet 23. Again should the thermostat coil 44 be hot or expanded when the valve stem 65 is swung or moved to the right then, and in that event, the sleeve valve 29 and its ports 30 and 31 will assume or be in the position, relative to the inlets 22 and 23, indicated in Fig. 12. However, as the cold water flows outwardly through the faucet 24, such water will cause said thermostat coil to contract and in so doing the latter will impart rotative movement to the sleeve valve 29 in a clockwise direction and thus cause its ports 30 and 31 to assume or be in the position, relative to the inlets 22 and 23, indicated in Fig. 13. If warm or tepid water is desired the operator swings the valve stem 65 in the direction necessary until the pointer 62 registers with the desired graduation 63, at which time, the ports 30 and 31 will be in their proper positions relative to their supply inlets 22 and 23 to furnish water at the desired temperature.

From the foregoing description taken in connection with the accompanying drawings, it will be manifest and apparent, that the present novel and improved thermostatic faucet will rapidly and readily furnish water at any selected stabilized or constant temperature between the initial temperatures of the hot and cold water.

In Fig. 14, I have illustrated a slightly modified form of fluid outlet and outlet valve for my thermostatic faucet, wherein the numeral 73 designates a faucet body having a fixed outlet or integral discharge spout 74 formed upon the lower end thereof, said body also having a valve seat 75 formed therein, upon which normally seats a valve 76, of the disk or washer type, for controlling the flow of water outwardly through said discharge spout 74, and for this purpose said valve is detachably secured to a valve shaft 77 of similar construction and type, as hereinbefore described for the valve shaft 46.

In Fig. 15, I have illustrated a further slightly modified type of thermostatic faucet, which latter is particularly adapted to be interposed in pipe lines at suitably spaced intervals therein, or in any other plumbing installation wherein the faucet 24 could not readily be employed.

The numeral 78 designates a faucet body having diametrically opposed exteriorly threaded inlets, one of which is shown at 79 and to which is detachably secured, as by a union nut 80, a fluid supply pipe 81, said faucet body having an open upper end adapted to be normally closed by a cover 82 threadedly secured thereon. Disposed for oscillative movement within the faucet body 78 is a sleeve valve 83 having diametrically opposed elongated inlet ports formed in the walls thereof, one of which is shown at 84 said part being adapted to register when necessary with the inlet 79. The sleeve valve 83 is provided with an upper or initial mixing chamber 85, a final mixing chamber 86 and a temperature regulating chamber 87 formed therein. The upper mixing chamber 86 is formed by the side and upper end walls of the sleeve valve, a centrally disposed tubular portion 88 depending from said upper end wall and an upwardly directed frustroconical wall or partition 89 theadedly and concentrically secured at its lower end within the sleeve valve. The final mixing chamber 86 is formed by said tubular portion 88, frustro-conical wall 89 and a transversely disposed wall or partition 90 integrally formed with said frustro-conical wall as a unit, said transverse wall 90 being centrally apertured to permit of the lower terminal of said tubular portion 88 extending therethrough, as shown in Fig. 15. The transverse wall 90 is provided with a series of perforations 91 wherethrough the intermixed fluids pass to the temperature stabilizing or regulating chamber 87, which latter is formed by the cylindrical walls of the sleeve valve 83 and said transverse wall 90, said chamber 87, being open at its lower end to the interior of the faucet body in the identical manner to that hereinbefore described for the temperature regulating chamber 38 of the sleeve valve 29.

Concentrically disposed within the tubular portion 88 for axial and rotative movement therein is a valve shaft 92, which latter at its upper and lower ends extends from said tubular portion, as shown, and is identical in construction and function as the valve shaft 46 of the faucet 24, hereinbefore described, with one exception, that is, the valve shaft 92 extends through a stuffing box 93 provided upon the under or inner side of the cover 82, this in order to positively prevent leakage of fluid around said shaft at the point where it passes through said cover, it being here noted that the upper end wall of the sleeve valve 83, is suitably recessed or counterbored to provide the necessary clearance for the stuffing box 93.

In Fig. 16, I have illustrated a hot and cold water supply system equipped with or embodying my novel and improved thermostatic faucets, such system being generally designated by the numeral 94 and comprises a master hot water thermostatic supply faucet 95 and a master cold water thermostatic faucet 96, to the inlets of which are connected hot and cold water supply pipes 97 and 98, respectively.

Leading upwardly from the oulet of the master hot water thermostatic faucet 95 is a hot water supply pipe or manifold 99 and similarly leading from the outlet of the master cold water thermostatic faucet 96 is a cold water supply pipe or manifold 100. Interposed at suitably spaced intervals in the hot water manifold pipe 99 and extending therefrom in perpendicular relation thereto are branch pipes 101 and similarly interposed in the cold water manifold pipes and extending therefrom in spaced parallel relation to the branch pipes 101 are cold water branch pipes 102. Interposed between and connected at suitably spaced intervals, to adjacent hot and cold water branch pipes 101 and 102 are discharge or outlet faucets 103. It being here noted and observed that the master hot and cold water supply thermostatic faucets 95 and 96 are identical in construction and function to the faucet 24 hereinbefore described, while the outlet faucets 103 have no thermostat coils therein, but in every other respect are identical in construction to the faucet 24, said valves 103 functioning merely as mixing devices.

In the operation of the system 94 the master thermostatic faucets 95 and 96, respectively, are set for predetermined temperatures so that the temperatures of the hot and cold water in the manifold pipes 99 and 100 are stabilized and constant, hence, the temperatures of the hot and cold waters at the outlet or mixing faucets 103 are substantially constant and uniform. The hot and cold water supply system herein shown and described is particularly adaptable and suitable for furnishing hot and cold water to commercial buildings, apartment houses, or the like, inasmuch, as such waters are furnished to each floor of the same at substantially even and non-fluctuating temperatures, and in consequence considerable economy is effected by reason of the fact that the basic temperatures of the hot and cold water are regulated and controlled by the master thermostatic faucets 95 and 96, respectively. The hot and cold water supply pipes 97 and 98, respectively, lead from water heating and cooling units, not shown, which units may be thermostatically controlled in any well known manner not shown, by their respective master faucets 95 and 96, so that when the desired temperatures are reached at such faucets said units may be automatically cut out and again automatically cut in when the temperatures fall at said faucets, thus effecting economy in the operation of both the heating and cooling units of said system, as will be manifest and apparent.

While I have herein shown and described the invention with sufficient detail to enable those skilled in the art to which it pertains to understand the mode of construction and the principles involved, it is to be understood that there is no intentional limitation herein to the specific forms and precise details of construction shown and described, except as expressly defined by the appended claims, and that various modifications of the same may be resorted to without departing from the spirit of the invention or the benefits derivable therefrom. It is also to be understood that certain features of the invention herein disclosed may be employed in and with other combinations than those shown and described.

What I claim as my invention and desire to secure by Letters Patent is:—

1. In combination in a thermostatic faucet, a casing provided with fluid inlets and a fluid outlet, a partially rotative sleeve valve provided with ports adapted to register with said fluid inlets, a reciprocative valve for said fluid outlet, and a thermostat of coil form interconnecting said sleeve valve and reciprocative valve.

2. A thermostatic faucet comprising a casing open at one end thereof and provided with fluid inlets at its sides and a fluid outlet at its opposite end, a cover for said open end, a sleeve valve disposed within the open end portion of said casing provided with ports adapted to selectively register with the fluid inlets thereof, said sleeve valve having a fluid mixing chamber formed therein provided with a foraminous wall at one end thereof, a valve for closing said fluid outlet having a stem extending therefrom through said sleeve valve and casing cover, a thermostat of coil form disposed within said sleeve valve exteriorly of and in contiguous relation to the foraminous wall of its mixing chamber having one end connected to the sleeve valve and its opposite end connected to said valve stem, and manual operable means for effecting selective registration of the ports of the sleeve valve with the fluid inlets and for effecting independent opening and closing of said fluid outlet valve.

3. A thermostatic faucet comprising a casing, a rotary valve member, a reciprocating valve member, heat responsive means, controlling said rotary valve member, and a control member operatively connected to said valve members for effecting selective actuation of the same.

4. A thermostatic faucet comprising a casing provided with fluid inlets and a fluid outlet, a semi-rotative control member mounted in said casing having separated ports opposed to said fluid inlets, heat responsive means connected to said control member for varying the cross-sectional areas of said fluid inlets, a valve for said fluid outlet, and hand-operated means for effecting simultaneous and selective actuation of said control member and outlet valve.

5. A thermostatic faucet comprising a casing provided with fluid inlets and a fluid outlet, a semi-rotative hollow control member mounted within said casing having separated ports opposed to said fluid inlets, a thermostat adapted to move said control member to vary the cross-sectional area of said fluid inlets, a valve for said fluid outlet, and a controlling handle exteriorly of said casing for effecting simultaneous and selective adjustment of said thermostat and outlet valve.

6. A thermostatic faucet comprising a casing, supply and outlet means, a valve controlling the supply means, a valve for the outlet means, a thermostat carried by the valve for the outlet means and engaging the valve for the inlet means for automatic operation thereof, and a control member connected to said supply and outlet valves adapted to regulate the volume of fluid at any temperature.

7. In combination in a thermostatic faucet, a casing provided with fluid inlets, a sleeve valve provided with apertures in the walls thereof adapted to register with said fluid inlets, said sleeve valve having a perforated transversely disposed wall adapted to form a fluid mixing chamber therein, a frusto-conical baffle extending from said perforated wall within said mixing chamber, and a thermostat connected to said sleeve valve.

8. The combination with a casing provided with fluid inlets, and a sleeve valve having ports formed in the walls thereof adapted to register with said fluid inlets, said sleeve valve having a perforated transversely disposed wall adapted to form a fluid mixing chamber therein and also having a frusto-conical baffle extending from said perforated wall within said mixing chamber.

9. The combination of a casing provided with fluid inlets, a sleeve valve having ports formed in its walls adapted to register with said fluid inlets, said sleeve valve having a transversely disposed perforated wall between said ports and its outlet end adapted to form a mixing chamber therein, and a baffle for the ports of said sleeve valve extending from said perforated wall within said mixing chamber.

10. The combination of a casing provided with fluid inlets, a sleeve valve having ports formed in its walls adapted to register with said fluid inlets, said sleeve valve having a fluid mixing chamber formed within the inlet end thereof wherewith said ports communicate, a baffle for said ports extending within said mixing chamber, a thermostat of coil form disposed within the outlet end of said sleeve valve and connected at one end thereto, and means for adjusting the position of said sleeve valve connected to the other end of said thermostat.

11. The combination of a casing provided with fluid inlets, a sleeve valve having ports formed in its walls adapted to register with said fluid inlets, said sleeve valve having a fluid mixing chamber formed therein wherewith said ports communicate, a baffle for said ports extending within said mixing chamber, a thermostat of coil form disposed within the outlet end of said sleeve valve and connected at one end thereto, and means for adjusting the position of said sleeve valve connected to the other end of said thermostat, said means including a pointer adapted to indicate upon a scale a temperature for the fluid corresponding to the adjusted position of the sleeve valve.

12. In a device of the character described, a casing having a pair of hot and cold water inlet ports, a proportioning valve controlling the flow of water from the said ports, a thermostat coil connected at one end to the proportioning valve and exposed to the water flowing from said ports, a shaft connected to the other end of the thermostat coil and a pointer connected to the shaft for setting the thermostat coil to different positions, the casing having also an outlet port, and a handle mounted upon the said pointer for movement therewith but having movement independently thereof, and operative connections between the handle and the outlet valve causing the outlet valve to open when the handle is moved independently of the pointer.

MARLOW GLENN.